United States Patent [19]

Sakurai

[11] Patent Number: 5,347,317
[45] Date of Patent: Sep. 13, 1994

[54] HORIZONTAL OSCILLATION CONTROL CIRCUIT FOR A CATHODE-RAY TUBE

[75] Inventor: Haruo Sakurai, Nagasaki, Japan

[73] Assignee: Mitsubishi Denki Kabushiki Kaisha, Tokyo, Japan

[21] Appl. No.: 911,086

[22] Filed: Jul. 9, 1992

[30] Foreign Application Priority Data

Jan. 16, 1992 [JP] Japan ................. 4-024278

[51] Int. Cl.$^5$ .............................................. H04N 5/04
[52] U.S. Cl. ................................................... 348/511
[58] Field of Search ............................ 331/14, 20, 50; 358/158, 159; 348/511; H04N 5/04

[56] References Cited

U.S. PATENT DOCUMENTS 5,138,283  8/1992  Tanizoe .................. 358/158 X
5,235,422  8/1993  Ido et al. ................ 358/158

FOREIGN PATENT DOCUMENTS 3808280  9/1989  Fed. Rep. of Germany .
3931946  4/1990  Fed. Rep. of Germany .
64-71380  3/1989  Japan ..................... H04N 3/27
1-101776  4/1989  Japan ..................... H04N 3/16

OTHER PUBLICATIONS

*Patent Abstracts of Japan*, vol. 14, No. 16, E-872, Jan. 12, 1990.
*Patent Abstracts of Japan*, vol. 14, No. 194, E-919, Apr. 20, 1990.

Primary Examiner—Mark R. Powell
Attorney, Agent, or Firm—Burns, Doane, Swecker & Mathis

[57] ABSTRACT

The present invention relates to a horizontal oscillation circuit for generating horizontal drive pulses to be used for a cathode-ray tube. A microcomputer measures the frequency or the period of an input horizontal synchronizing signal, takes out a target value corresponding to the measured frequency or the period from an EEPROM, and gives a set value corresponding to the target value to a first D-A converter. The microcomputer also gives a set value corresponding to $\frac{1}{2}$ of a period of the input horizontal signal to a second D-A converter. A first monostable multivibrator outputs a pulse signal having pulse widths corresponding to the output voltage of the first D-A converter. A second monostable multivibrator outputs a horizontal drive pulse signal having pulse widths corresponding to the output voltage of the second D-A converter. Furthermore, the microcomputer compares the output pulse width of the first monostable multivibrator output from a first counter with a latch with a target value, and gives a set value to the first D-A converter to make the output pulse width of the first monostable multivibrator approach the target value. The microcomputer also compares the output pulse width of the second monostable multivibrator output from the second counter with a latch with $\frac{1}{2}$ of a period of the input horizontal signal and gives a set value to the second D-A converter to make the output pulse width of the second monostable multivibrator approach $\frac{1}{2}$ of a period of the input horizontal signal.

11 Claims, 9 Drawing Sheets

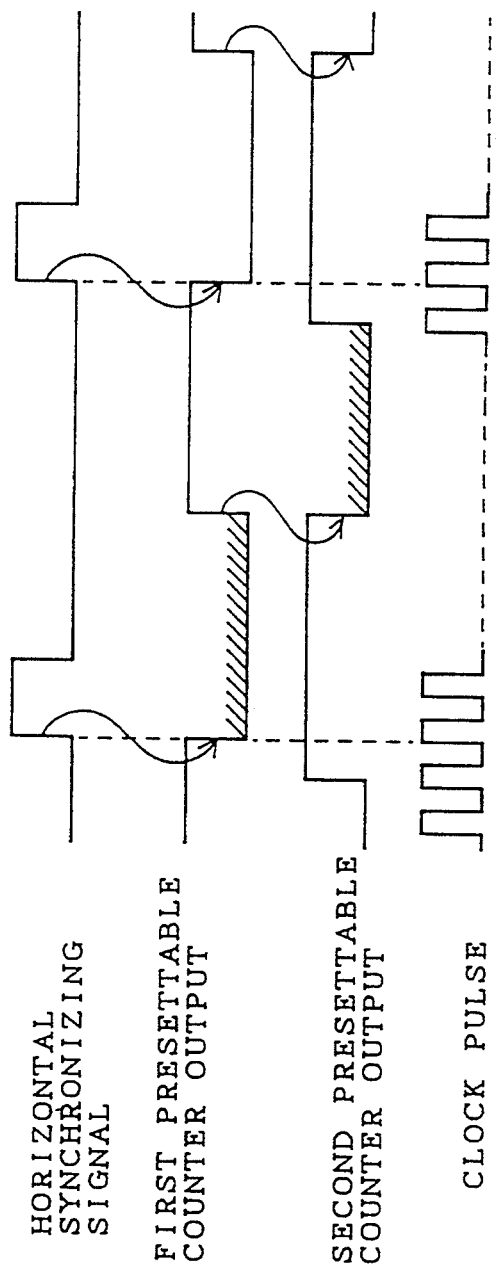

HORIZONTAL OSCILLATION CONTROL CIRCUIT FOR A CATHODE-RAY TUBE

BACKGROUND OF THE INVENTION

FIELD OF THE INVENTION

The present invention relates to a horizontal oscillation control circuit for a cathode-ray tube of a direct driving system.

FIG. 1 is a block diagram showing a conventional horizontal oscillation control circuit shown in a Japanese patent, laid open No. '89-101776, for example. In the figure, 1 is a first monostable multivibrator (hereinafter referred to as an M/M) which outputs a pulse signal synchronized with a horizontal synchronizing signal, and 2 is a second M/M which outputs horizontal drive pulses being synchronized with the pulse signal output from the first M/M to be supplied to the next horizontal drive circuit.

A part 3 is a shaping circuit for shaping the waveform of a flyback pulse (hereinafter referred to as a FBP), and 4 is a phase comparator which compares the phase of a waveform-shaped FBP and that of an input horizontal synchronizing signal, and outputs a digital output corresponding to the phase difference. A part 5 is a charge pump which converts the output of the phase comparator 4 to an analog output, and 6 is a low pass filter (hereinafter referred to as an LPF) which removes the AC component and the noise in the output of the charge pump 5 and supplies the output signal to the first M/M 1.

A part 7 is an integration circuit for integrating a horizontal drive pulse signal output from the second M/M 2, and 8 is a differential amplifier which compares the output of the integration circuit 7 and a reference level and supplies the differential output to the second M/M 2 for controlling the pulse width of the horizontal drive pulse signal.

Next, the operation will be explained. The FBP from a horizontal output circuit, whose drawing is omitted, is converted to a TTL level through waveform-shaping by a shaping circuit 3. The waveform-shaped FBP is input to the phase comparator 4 together with a horizontal synchronizing signal which is input from the exterior. The phase comparator 4 compares these signals and outputs a digital signal having a pulse width corresponding to the phase difference. When the input horizontal synchronizing signal leads the FBP, the phase comparator outputs a S1 signal to the charge pump 5, and when the input horizontal synchronizing signal lags behind the FBP, it outputs a S2 signal to the charge pump 5. When the S1 signal is input to the charge pump 5, it is controlled to raise the output and when the S2 signal is input to it, it is controlled to lower the output. The output of the charge pump 5 is input to the LPF 6 and the AC component and noise are eliminated to be a DC voltage and it is input to the first M/M 1 as a bias voltage which specifies the output pulsewidth of the first M/M 1. Therefore, when the horizontal synchronizing signal leads the FBP, the pulse width of a pulse signal output from the first M/M 1 is narrowed and the FBP is adjusted to be in phase with the horizontal synchronizing signal. In contrast with this, when the horizontal synchronizing signal lags behind the FBP the pulse width of the pulse signal output from the first M/M 1 is widened and the FBP is adjusted to be in phase with the horizontal synchronizing signal. The trailing edges of the horizontal synchronizing signal and those of the FBP are adjusted to coincide with each other as shown in FIG. 2, for example.

On the other hand, when the frequency of the horizontal synchronizing signal becomes higher, the differential output voltage of the differential amplifier 8, in which the output of the integration circuit 7 integrating the horizontal drive pulse signal is compared with the reference level, becomes higher, so that the pulse width of the horizontal drive pulse signal output from the second M/M 2 is narrowed.

As described in the above, the phase and the pulse width of the horizontal drive pulse are controlled corresponding to the frequency of the input horizontal synchronizing signal; thereby, even when the frequency of the horizontal synchronizing signal is switched, normal driving is possible and the picture can be displayed in a fixed range.

Since a conventional horizontal oscillation control circuit is constituted as mentioned in the above, a horizontal drive pulse signal in phase with the input horizontal synchronizing signal is output at all times. In other words, as shown in FIG. 2, the horizontal synchronizing signal and the horizontal drive pulse signal (output of the second M/M 2) are overlapped with one another. Therefore, the picture position cannot be freely adjusted, and it is difficult to absorb the difference in timing caused by the difference in manufacturers or types of equipment. The control is executed by an analog control, which increases the number of parts and requires a large mounting space; moreover, there has been a problem that the control cannot correspond to a microcomputer control.

SUMMARY OF THE INVENTION

The present invention is invented for solving the problem as described in the above, and an object of the invention is to obtain a horizontal oscillation control circuit which makes it possible to freely adjust picture positions in displays of various manufacturers and types of equipment and to decrease the number of parts and the mounting space and also to correspond easily to a microcomputer control.

A horizontal oscillation control circuit according to the present invention comprises: a first counter with a latch which transmits data to a control section obtained in measuring the pulse width of a pulse signal from the first M/M which generates a pulse signal being synchronized with an input horizontal synchronizing signal; a second counter with a latch which transmits data to the control section obtained measuring the pulse width of a signal output from the second M/M which generates a horizontal drive pulse signal based on the pulse signal output from the first M/M; and first and second digital to analog converters (hereinafter referred to as D-A converters) which control the pulse widths of the first and the second M/M in converting the control signal set by the control section based on the transmitted measurement data to an analog signal.

Another mode of a horizontal oscillation control circuit according to the present invention comprises a third M/M, a counter with a latch and a D-A converter, and they are disposed between the first M/M, the counter with a latch and a D-A converter, and the second M/M, the counter with a latch and a D-A converter.

A further mode of a horizontal oscillation control circuit according to the present invention comprises a counter with a latch to be commonly used for respective M/M's and the counter is selectively connected to an M/M with a selector.

Yet another mode of a horizontal oscillation control circuit according to the present invention comprises presettable counters, in which a set value can be preset by the control section, in place of an M/M and a D-A converter, and the first presettable counter generates a pulse signal synchronizing with the horizontal synchronizing signal in counting the number of synchronous clock pulses utilizing the horizontal synchronizing signal as trigger pulses, and the second presettable counter generates a horizontal drive pulse signal in counting the number of the synchronous clock pulses utilizing the pulse signal generated in the first presettable counter as trigger pulses.

The first D-A converter according to the present invention converts a control signal set by the control section based on the pulse width of the pulse signal output from the first M/M to an analog signal and controls the pulse width of the pulse signal, and the second D-A converter converts a control signal set by the control section based on the pulse width of the horizontal drive pulse signal output from the second M/M to an analog signal and controls the pulse width of the horizontal drive pulse signal; thereby, a horizontal oscillation control circuit can be realized in which even if there is a difference in timing caused by a difference in types of equipment, etc., a picture position can be freely adjusted, the number of parts and the mounting space can be decreased, and also the correspondence to the microcomputer control is easy.

The third M/M is disposed between the first M/M and the second M/M. Therefore, a horizontal oscillation control circuit is realized in which it is made possible to divide a pulse width adjustment into a rough adjustment and a fine adjustment, to decrease the jitter of a horizontal drive pulse signal and to perform a fine adjustment. Moreover, a horizontal oscillation control circuit is realized in which the number of parts can be decreased in selectively connecting a counter with a latch to a plurality of M/M's by the use of a selector.

In a case where the first and the second presettable counters are provided, a counting action is performed with basic clock pulses which are in phase with the horizontal synchronizing signal, and a horizontal oscillation control circuit can be realized in which the number of parts is small and complete digitization is also possible.

BRIEF DESCRIPTION OF THE DRAWINGS

FIG. 9 is a timing chart showing an example of the change of each signal shown in FIG. 8.

DETAILED DESCRIPTION OF THE PREFERRED EMBODIMENTS

Figure 1:
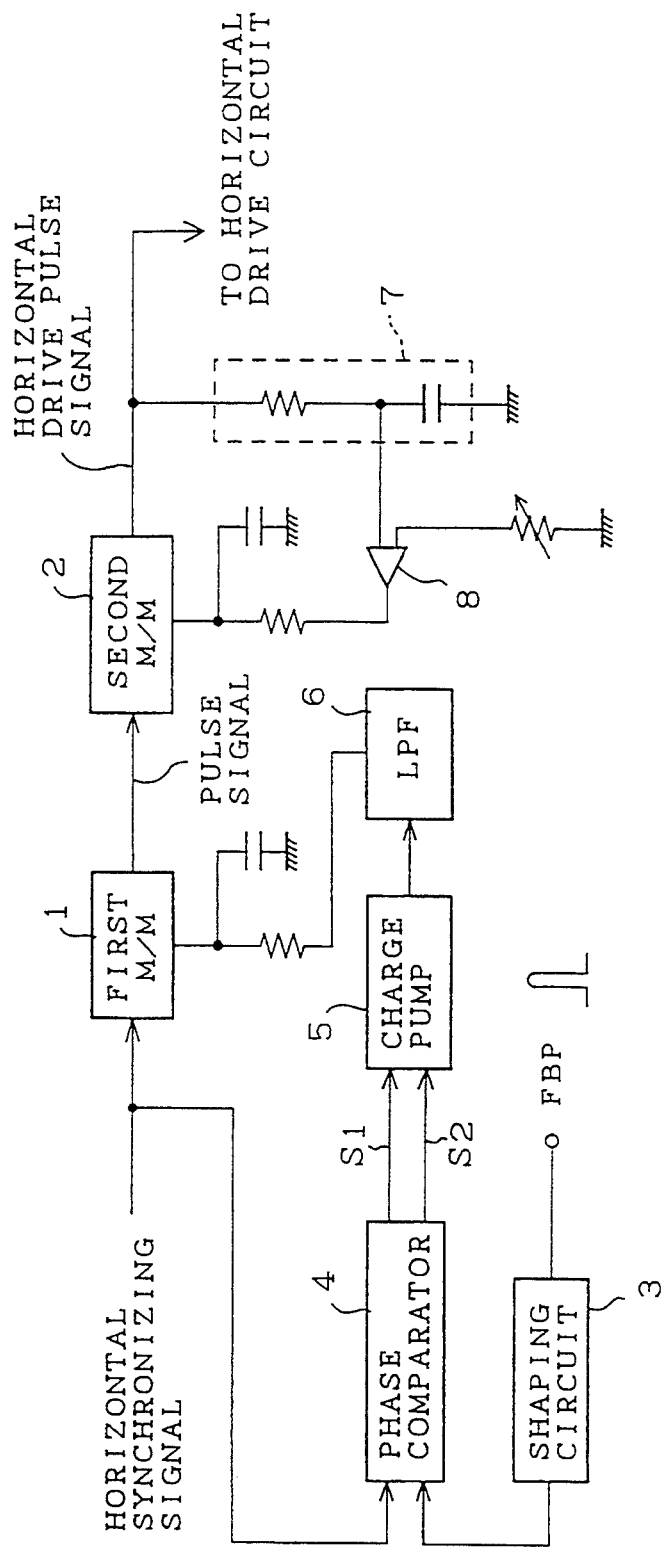
FIG. 1 is a block diagram showing a conventional horizontal oscillation control circuit.
Figure 2:
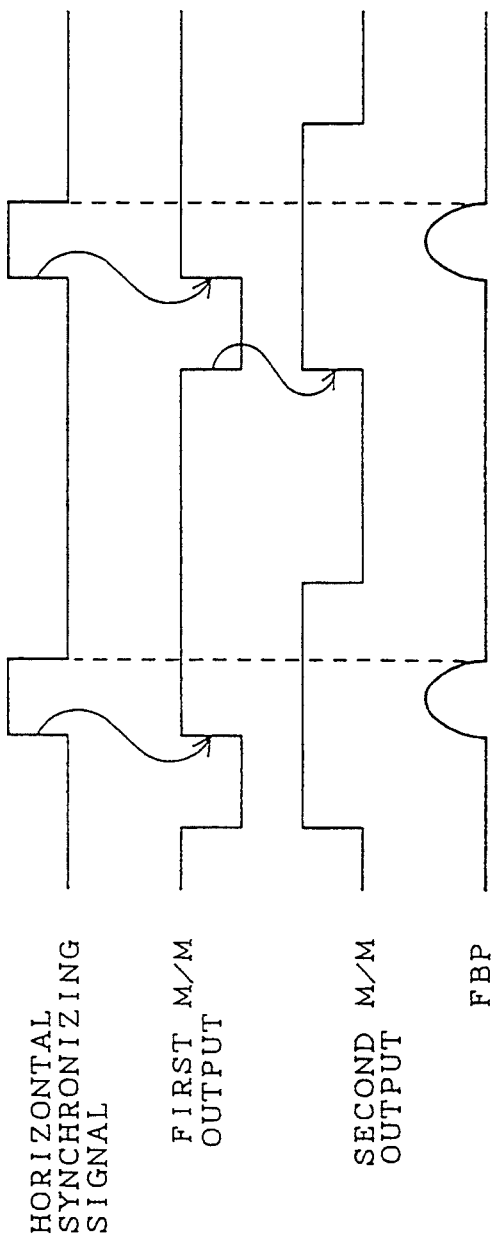
FIG. 2 is a timing chart showing an example of the change of each signal.
Figure 3:
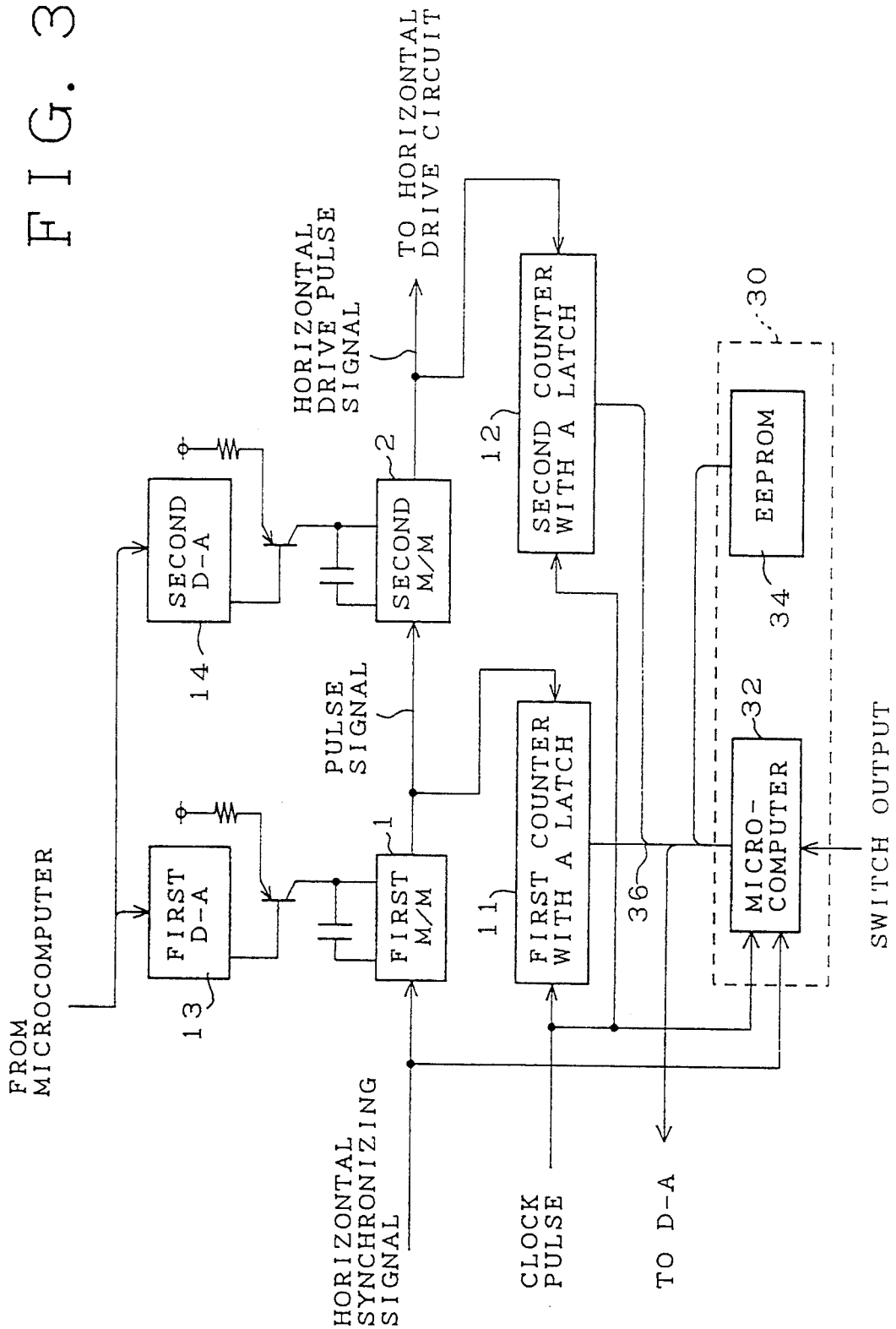
FIG. 3 is a block diagram showing a first embodiment according to the present invention.

An embodiment according to the present invention will be explained referring to the drawings in the following. FIG. 3 is a block diagram showing a first embodiment according to the present invention. In the figure, 1 is a first M/M and 2 is a second M/M, and those parts having the same symbols as those in FIG. 1 showing a conventional apparatus are the parts which are the same as or equivalent to the parts shown in FIG. 1, so that the detailed explanation of them will be omitted. In this case, the first M/M 1 outputs a low level pulse output using rising edges of the horizontal synchronizing signal as trigger pulses, and the second M/M outputs a low level pulse output using rising edges of the pulse output from the first M/M as trigger pulses.

A part 11 is a first counter with a latch which measures the pulse widths of a pulse signal output from the first M/M 1 and transmits the data to a microcomputer 32. A part 12 is a second counter with a latch which measures the pulse widths of a pulse signal output from the second M/M 2 and transmits the data to the microcomputer 32.

A part 13 is a first D-A converter which converts a first control signal (a first set value) set by the microcomputer 32 to an analog signal and transmits it to the first M/M 1, and 14 is a second D-A converter which converts a second control signal (a second set value) set by the microcomputer 32 to an analog signal and transmits it to the second M/M 2. A part 30 is a control section comprising an electrically erasable programmable ROM 34 (hereinafter referred to as an EEPROM) which stores a pulse width target value, and a microcomputer 32. A part 36 is a bus of the microcomputer 32.

Figure 4:
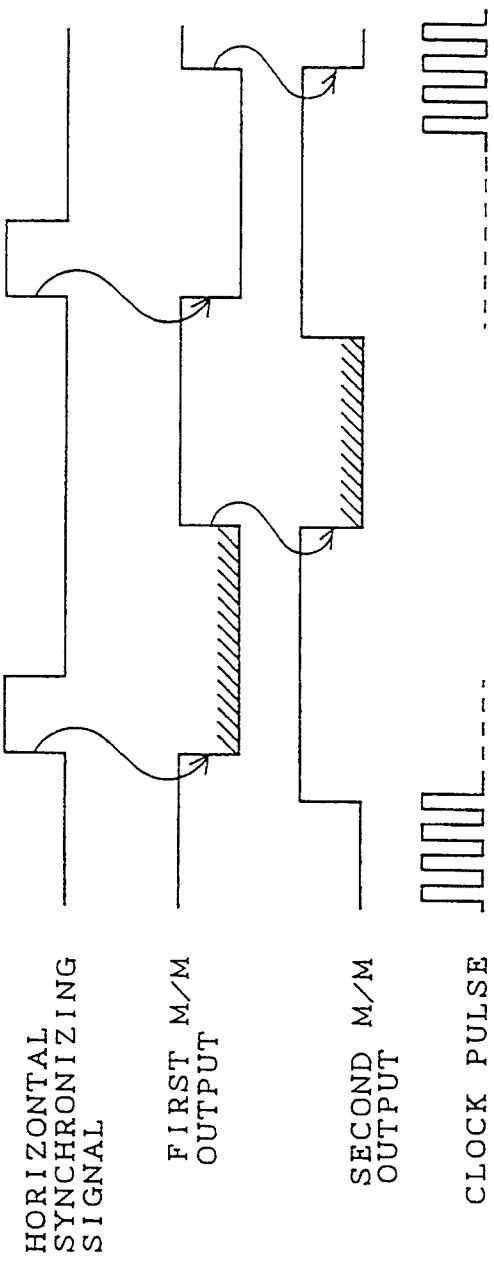
FIG. 4 is a timing chart showing an example of the change of each signal shown in FIG. 3.

FIG. 4 is a timing chart showing the change of each signal shown in FIG. 3.

Next, the operation will be explained. The EEPROM 34 stores a target value which corresponds to the frequency (or the period) of the horizontal synchronizing signal. When a horizontal synchronizing signal is input, the frequency (or the period) is measured by the microcomputer 32. In other words, the microcomputer 32 introduces a horizontal synchronizing pulse signal and clock pulses, and using the clock pulses it performs a frequency measurement or a period measurement with a built-in timer. The microcomputer 32 takes out a target count value for the first M/M corresponding to the measurement data from the EEPROM 34. Since the duty ratio of 50% is an optimum value for a horizontal drive signal, the count value for the second M/M 2 is decided to be ½ of the above-mentioned measured period. These count values correspond to the target pulse widths. Next, the microcomputer 32 sets a digital control signal, with which a value being close to and a little shorter than the target pulse width can be obtained, as an initial value for the pulse width setting in the first D-A converter 13 and the second D-A converter 14.

A charging current for a capacitor being connected to the first M/M 1 varies corresponding to the output voltage of the first D-A converter 13, so that the output pulse width of the first M/M 1 can be controlled by the output voltage of the first D-A converter 13. In other words, the output pulse width varies corresponding to a digital value given to the first D-A converter 13. The output pulse width of the second M/M 2 varies similarly corresponding to a digital value given to the second D-A converter 14. The first and the second counters 11 and 12 measure the pulse widths output from the first and the second M/M's 1 and 2 respectively. The measurement data are transmitted to the microcomputer 32 and compared with target values. In the result of comparison, if they do not coincide with each other, the microcomputer 32 controls the control signal for the D-A converter 13 or 14 bit by bit to make the pulse widths output from the first M/M 1 and the second M/M 2 equal to respective target values.

When a picture position is to be adjusted, the microcomputer inputs a movement signal to the right or left given by a switch input operated by an operator, for example. In order to adjust the pulse width of a pulse signal output from the first M/M 1, a value shown by a control signal which is to be set in the first D-A converter 13 is increased or decreased bit by bit. When the adjustment is completed, the measured value of the pulse width at the time is set in the EEPROM 34. After that, the set value becomes a target value for the horizontal synchronizing signal ($H_1$). Then a horizontal synchronizing signal of another frequency $H_2$ is handled and after that if the horizontal synchronizing signal $H_1$ is to be handled again, the control is executed according to the finally adjusted target value stored in the EEPROM.

In the above-mentioned first embodiment, the case where only the first M/M 1 is used for the control of a picture position is described, but when the frequency of an input horizontal synchronizing signal is low, the pulse width of a pulse signal output from the first M/M 1 becomes wide and the movement quantity caused by the change of 1 bit of the first D-A converter 13 becomes large, which makes it difficult to perform a fine adjustment.

Figure 5:
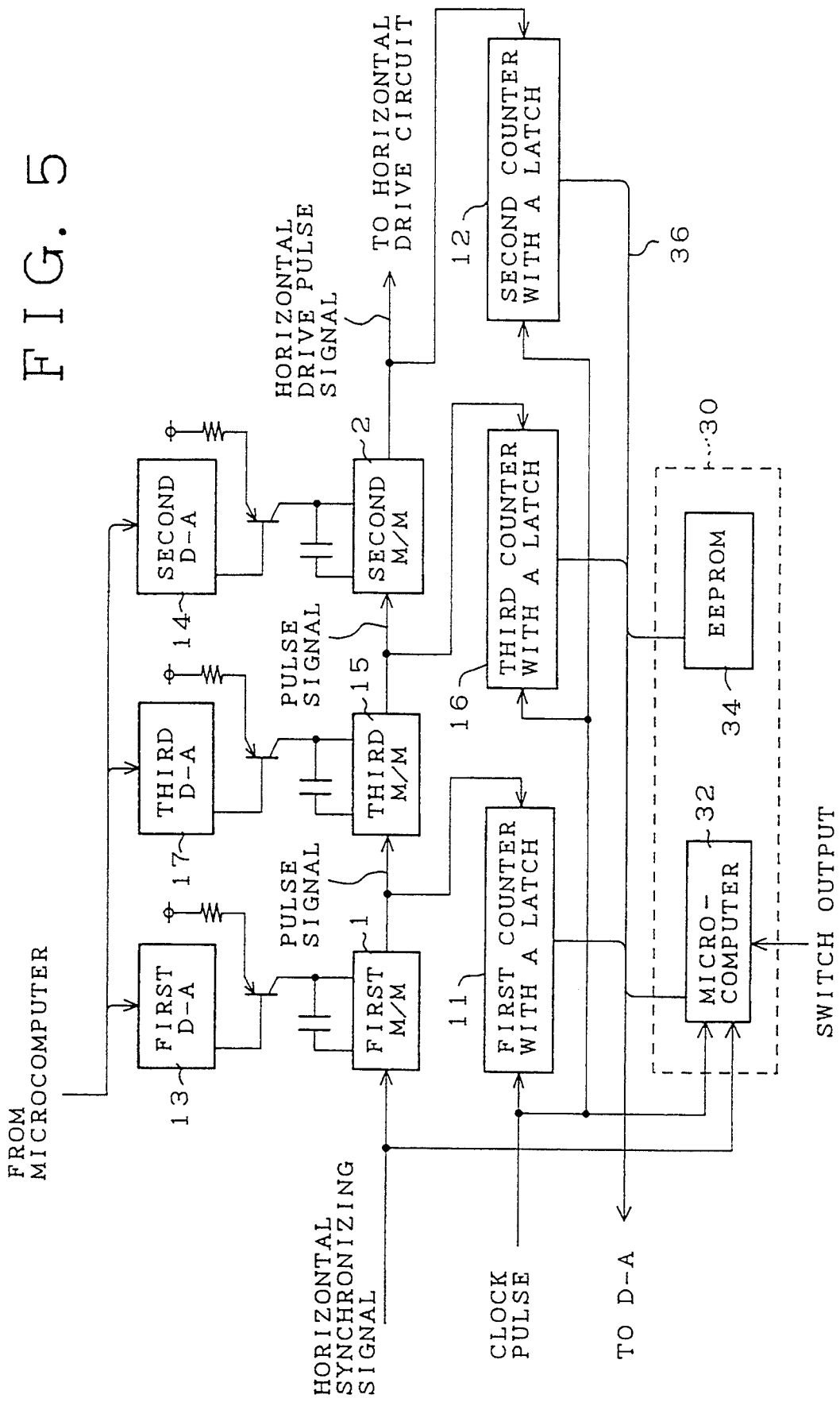
FIG. 5 is a block diagram showing a second embodiment according to the present invention.

FIG. 5 is a block diagram showing a second embodiment contrived for solving such a problem. As shown in the figure, a fine adjustment of a picture display position is made possible by disposing a third M/M 15 between the first M/M 1 and the second M/M 2.

In the figure, 16 is a third counter with a latch which measures the pulse width of a pulse signal output from the third M/M 15 and transmits the data to the microcomputer 32, and 17 is a third D-A converter which converts a third control signal, which is set by the microcomputer 32 based on the measured value of the pulse width, to an analog signal and transmits the signal to the third M/M 15 for the control of the pulse width of a pulse signal output from the M/M 15. About the other parts, the explanation is omitted giving the same symbols as those of the corresponding parts shown in FIG. 3.

Figure 6:
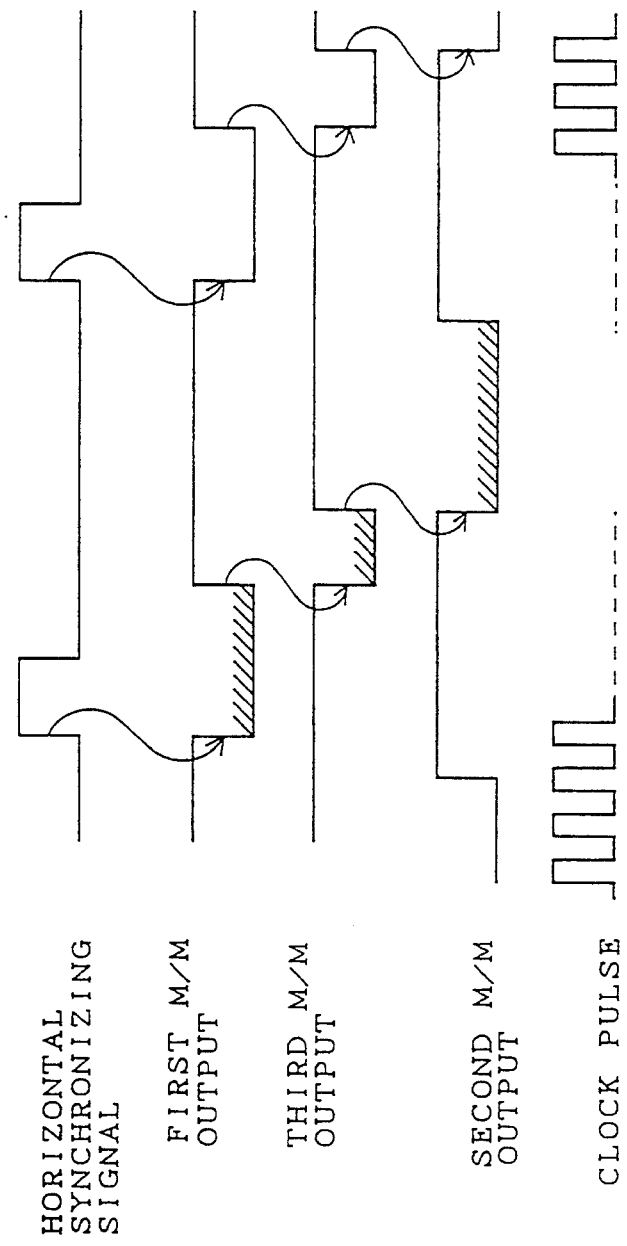
FIG. 6 is a timing chart showing an example of the change of each signal shown in FIG. 5.

FIG. 6 is a timing chart showing the change of each signal shown in FIG. 5.

Next, the operation will be explained. In this case, the first M/M 1 is used as a rough adjuster and the third M/M 15 is used as a fine adjuster, for example. In the EEPROM 34, the sum of the pulse width of a pulse signal output from the first M/M 1 and the pulse width of a pulse signal output from the third M/M 15 is stored, and the microcomputer 32 decides the pulse width of a pulse signal from the first M/M 1 and the pulse width of a pulse signal from the third M/M 15 based on a fixed fraction of the above-mentioned stored value and adjust them respectively.

The microcomputer 32, for example, gives a specified digital control signal to the first D-A converter 13 as an initial value for setting, and adjusts the pulse width of a pulse signal of the first M/M 1. Then it gives a digital control signal which corresponds to the difference between the measured value of the pulse width of the pulse signal of the first M/M 1 and the stored value in the EEPROM to the third D-A converter 17 as an initial value of the third set value. After that, the microcomputer 32 varies the third set value to be given to the third M/M 15 in order to make the sum of the output value of the first M/M 1 and the output value of the third M/M 15 approach the first target value.

When a picture position is to be readjusted, similar to the control shown in the above-mentioned first embodiment, the microcomputer 32 decreases or increases bit by bit the value shown by the control signal to be given to the D-A converter 17 for the control of the pulse width of a pulse signal of the third M/M 15 corresponding to a movement signal given by a switch input. When the adjustment is completed, the sum of the pulse widths of the pulse signals of the first M/M 1 and the third M/M 15 at the time output from the first counter 11 and the third counter 16 is stored in the EEPROM 34. The control for the second M/M 2 is the same as that shown in the first embodiment.

Figure 7:
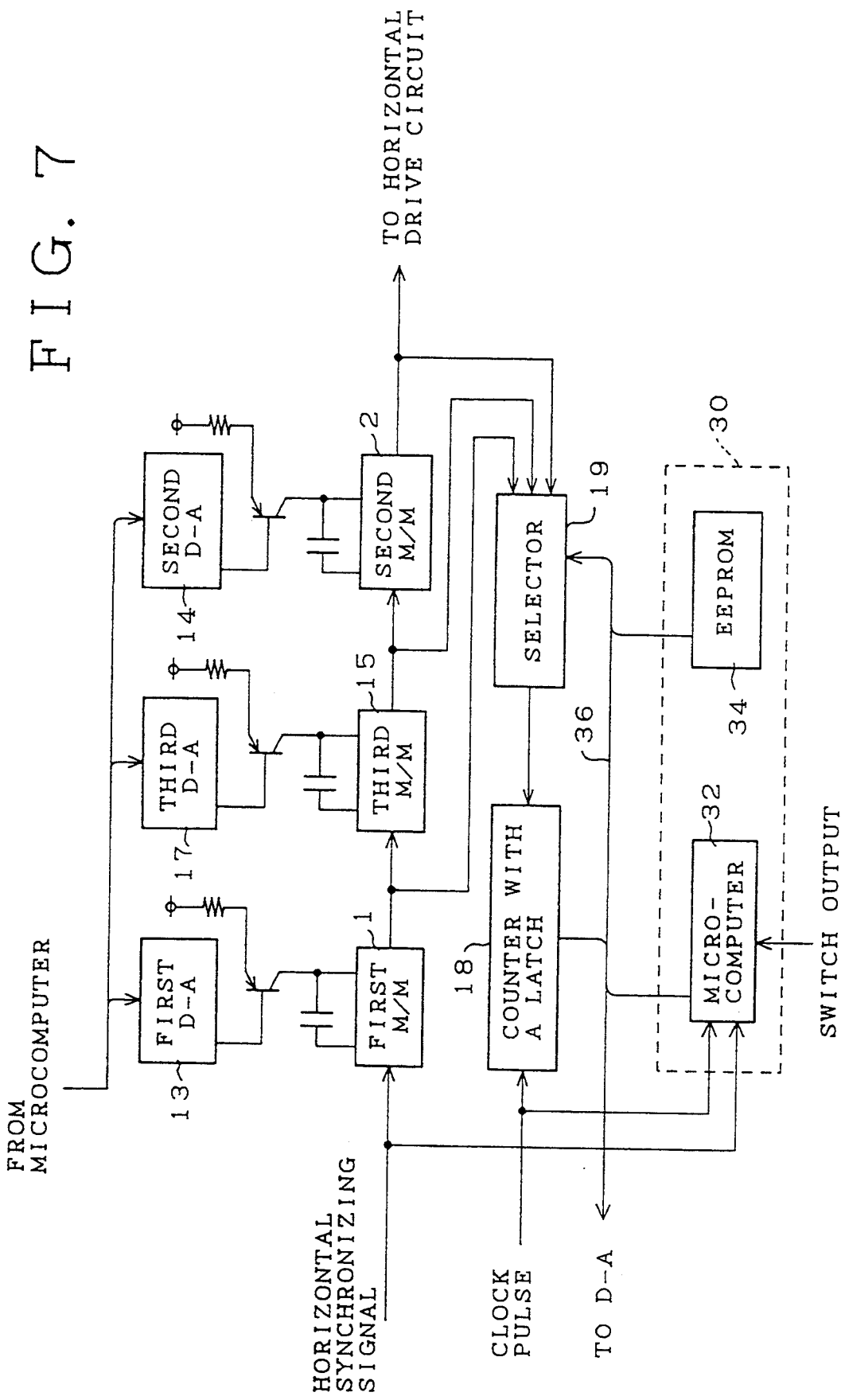
FIG. 7 is a block diagram showing a third embodiment according to the present invention.

In the above-mentioned first and second embodiments, a constitution in which a counter with a latch is connected to each of the M/M's is shown, but a counter with a latch can be commonly used for respective M/M's. FIG. 7 is a block diagram showing such a third embodiment as mentioned in the above. In the figure, 18 is a counter with a latch to be commonly used for the M/M's 1, 2 and 15, and 19 is a selector for selectively connecting the counter 18 to the M/M's 1, 2 and 15.

The microcomputer 32 controls the selector 19 so that the counter 18 can be connected to each of the M/M's 1, 2 and 15 in succession, and the measured values of the pulse widths of signals output from respective M/M's are taken in for the execution of processes similar to those in the second embodiment. Therefore, the number of counters can be decreased and the number of gates, when a gate array constitution is to be adopted, can also be decreased; thus the number of parts can be decreased. In FIG. 7, there is shown a case where 3 M/M's are provided; in the circuit shown in FIG. 3 where 2 M/M's are provided, it is possible to provide a counter 18 and a selector 19 in place of the first counter 11 and the second counter 12.

Figure 8:
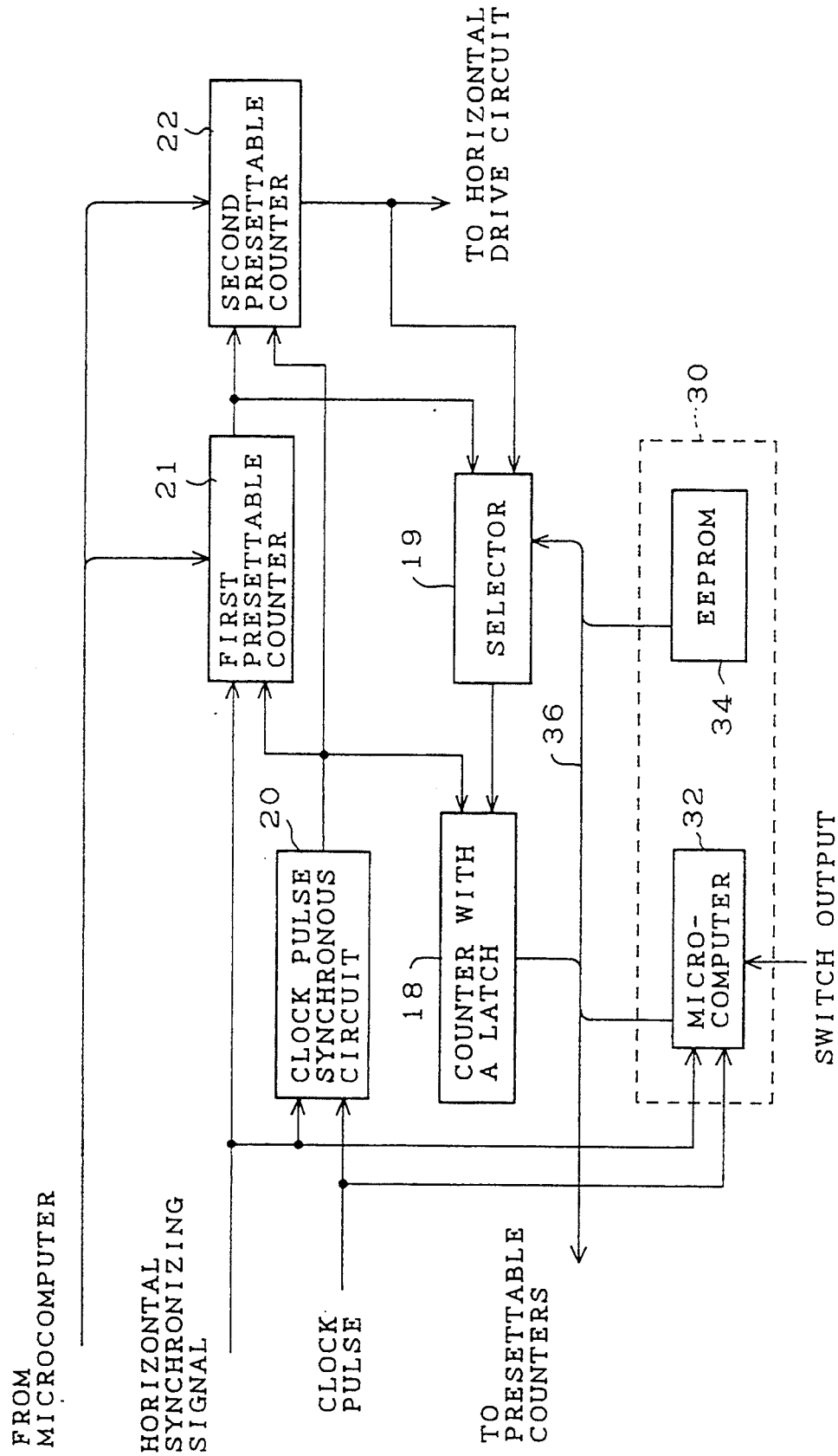
FIG. 8 is a block diagram showing a fourth embodiment according to the present invention.

Next, a fourth embodiment according to the present invention will be explained based on the drawings. FIG. 8 is a block diagram showing the fourth embodiment, and FIG. 9 is a timing chart showing the change of each signal shown in FIG. 8. In FIG. 8, 20 is a clock pulse synchronous circuit which generates synchronous clock pulses which are in phase with an input horizontal synchronizing signal. A part 21 is a first presettable counter to be preset with a first set value by the microcomputer 32, and it changes its output to a low level signal using the input horizontal synchronizing signal as trigger pulses and at the same time it starts counting of the synchronous clock pulses, and when the counting for the first set value is completed, it outputs a high level signal. In other words, it outputs a pulse signal having a pulse width corresponding to the first set value and synchronizing with the horizontal synchronizing signal. A part 22 is a second presettable counter, similar to the first presettable counter 21, and a second set value is preset to it by the microcomputer 32, and it counts the synchronous clock pulses using a pulse signal output from the first presettable counter 21 as trigger pulses, and outputs a horizontal drive pulse signal. As described in the above, in the fourth embodiment, the first M/M 1 and the D-A converter 13 in the first embodiment are replaced with the presettable counter 21, and the second M/M 2 and the D-A counter 14 are replaced with the second presettable counter 22. The first and the second presettable counters 21 and 22 perform counting operations using synchronous clock pulses which are in phase with the horizontal synchronizing signal to be output from the clock pulse synchronous circuit 20. Therefore, the state of each signal except a clock pulse is similar to that in the first embodiment as shown in FIG. 9; in this case, however, the control is executed synchronizing with the horizontal synchronizing signal. It is, of course, possible that the microcomputer 32 sets a sum of the first set value and the third set value in the first presettable counter 21 and executes a similar control to that in the second embodiment.

Therefore, a complete digital control is made possible, and even when a pulse width is wide, adjustment of high precision is made possible, and since the counting operation is performed using synchronous clock pulses which are in phase with the input horizontal synchronizing signal, an output without jitter can be obtained.

The adjustment of a picture position is performed, in a similar way to the above-mentioned embodiments, by the microcomputer 32 in adding or subtracting to or from the set value of the presettable counter 21 bit by bit corresponding to a switch input. After the completion of the adjustment, the set value is written in the EEPROM 34 by the microcomputer 32 in a similar way to the above-mentioned embodiments.

When the above-mentioned basic clock pulses are of high precision and stable for the environmental changes such as temperature changes, an accurate pulse width can be obtained in simply setting the value which the microcomputer 32 obtained by operation based on the period of the basic clock pulses or the value obtained from the set value written in the EEPROM 34. It is thereby possible to dispense with the counter 18 for measuring a pulse width and the selector 19.

As described in the above, it is made possible to obtain a horizontal oscillation control circuit in which a digital control is possible, the picture position can be freely adjusted even when there is a difference in timing due to a difference in types of equipment, the number of parts and the mounting space can be decreased, and also the correspondence to a microcomputer control is easy. This can be achieved if the horizontal oscillation circuit comprises a constitution in which the horizontal oscillation circuit measures the pulse widths of pulse signals output from the first M/M which outputs a pulse signal synchronizing with an input horizontal synchronizing signal and from the second M/M which generates a horizontal drive pulse signal based on the pulse signal output from the first M/M and transmits the measured data to a control section, and the control section converts a control signal which is set based on the measured data to an analog signal for controlling the pulse widths of a pulse signal output from the first or the second M/M.

In a case where the horizontal oscillation circuit has a constitution in which a third M/M is provided between the first and the second M/M's, the pulse width control can be divided into a rough adjustment and a fine adjustment, the jitter of a horizontal drive pulse signal can be decreased, and a finer adjustment can be per formed.

Furthermore, in the case of a constitution in which a counter with a latch for pulse width measurement is commonly used for respective M/M's, there is an effect to be able to decrease further the number of parts without deteriorating the function.

In the case of a constitution where an M/M is replaced with a presettable counter and digital setting is made possible, complete digitization is possible and a horizontal oscillation control circuit of small sized and of high precision can be obtained.

What is claimed is:

1. A horizontal oscillation circuit comprising: a first pulse generator section for generating a pulse signal having a pulse width corresponding to a first set value and for setting a picture display position using an input horizontal synchronizing signal as trigger pulses; a second pulse generator section for generating a horizontal drive pulse signal having a pulse width corresponding to a second set value using the trailing edges of the pulse signal output from said first pulse generator section; a first measurement section for measuring the pulse width of the pulse signal output from said first pulse generator section; a second measurement section for measuring the pulse width of said horizontal drive pulse signal; and a control section for outputting the first set value and the second set value such that a difference between an output of said first measurement section and a first target value is dissolved, and a difference between an output of said second measurement section and a second target value is dissolved.

2. A horizontal oscillation circuit described in claim 1, wherein the first pulse generator section comprises a first D-A converter for converting the first set value input from the control section to an analog value, and a first monostable multivibrator for outputting a pulse signal having a pulse width corresponding to the output of said first D-A converter using an input horizontal synchronizing signal as trigger pulses; a second pulse generator section comprises a second D-A converter for converting the second set value input from the control section to an analog value, and a second monostable multivibrator for outputting the horizontal drive pulse signal having a pulse width corresponding to the output of said second D-A converter using the trailing edges of the pulse signal output from said first monostable multivibrator as trigger pulses; the first measurement section comprises a first counter with a latch for measuring the pulse width of said pulse signal output from said first monostable multivibrator using a clock pulse signal as a reference signal and transmitting the measured data to the control section; and the second measurement section comprises a second counter with a latch for measuring the pulse width of the horizontal drive pulse signal output from said second monostable multivibrator using a clock pulse signal as a reference signal and transmitting the measured data to said control section.

3. A horizontal oscillation circuit described in claim 2, wherein the control section comprises: a nonvolatile memory having first target values corresponding various frequencies or periods; a timer for measuring the frequency or period of a horizontal synchronizing signal; and a microcomputer for taking out a first target value corresponding to a frequency or a period of an input horizontal synchronizing signal from said nonvolatile memory and outputting a corresponding digital value as an initial value of the first set value, outputting a digital value corresponding to the second target value, being ½ of a period of the input horizontal signal, as an initial value of the second set value, outputting a new digital value for dissolving the difference between the output value of the first counter with a latch and the first target value as the first set value, and outputting a new digital value for dissolving the difference between the output value of the second counter with a latch and the second target value as the second set value.

4. A horizontal oscillation circuit described in claim 3, wherein the control section changes the first set value to be given to the first pulse generator section corresponding to a movement signal for a picture position adjustment given from the exterior, and sets the output value of a first measurement section after the completion of the adjustment in the nonvolatile memory as the first target value.

5. A horizontal oscillation circuit described in claim 1, wherein the first measurement section and the second measurement section each comprise a selector for selecting the output of the first pulse generator section or the output of the second pulse generator section and a counter with a latch for measuring the pulse width of an output signal of said selector using reference clock pulses.

6. A horizontal oscillation circuit described in claim 1, further comprises: a clock pulse synchronous circuit for generating synchronous clock pulses of which a reference clock pulse signal being synchronized with the horizontal synchronizing signal; a first pulse generator section comprising a first presettable counter which starts counting of said synchronous clock pulses using input horizontal synchronizing signal as trigger pulses and outputs a pulse signal having pulse widths corresponding to the first set value input from the control section; and a second pulse generator section comprising a second presettable counter which starts counting of said synchronous clock pulses using the trailing edges of the output pulses from said first presettable counter as trigger pulses and outputs a pulse signal having pulse widths corresponding to the second set value input from the control section.

7. A horizontal oscillation circuit comprising: a first pulse generator section for outputting a pulse signal for roughly setting a picture display position, a pulse signal having pulse widths corresponding to the first set value, using an input horizontal synchronizing signal as trigger pulses; a second pulse signal generator section for generating a horizontal drive pulse signal having pulse widths corresponding to the second set value using trailing edges of a pulse signal output from a third pulse generator section; the third pulse signal generator section for generating a pulse signal for finely setting a picture display position, a pulse signal having pulse widths corresponding to a third set value using trailing edges of a pulse signal output from the first pulse generator section as trigger pulses; a first measurement section for measuring the pulse widths of a pulse signal output from said first pulse signal generator section; a second measurement section for measuring the pulse widths of said horizontal drive pulse signal; a third measurement section for measuring the pulse widths of a pulse signal output from said third pulse generator section; and a control section for inputting the third set value corresponding to the difference between the output from said first measurement section and the first target value to said third pulse generator section and outputting the first set value, the second set value and the third set value such that a difference between the sum of the output value of said first measurement section and the output value of said third measurement section, and the first target value is dissolved, and a difference between the output of said second measurement section and the second target value is dissolved.

8. A horizontal oscillation circuit described in claim 7, wherein the first pulse generator section comprises a first D-A converter for converting the first set value input from the control section to an analog value and a first monostable multivibrator for outputting a pulse signal corresponding to the output of said first D-A converter using an input horizontal synchronizing signal as trigger pulses; the second pulse generator section comprises a D-A converter for converting a second set value input from the control section to an analog value and a second monostable multivibrator for outputting a horizontal drive pulse signal having a pulse width corresponding to the output of said second D-A converter using trailing edges of said pulse signal as trigger pulses output from the third monostable multivibrator; a third pulse generator section comprises a third D-A converter for converting the third set value input from the control section to an analog value and a third monostable multivibrator outputting a pulse signal having pulse widths corresponding to the output of said third D-A converter using trailing edges of a pulse signal as trigger pulses output from said first monostable multivibrator; the first measurement section comprises a first counter with a latch for measuring the pulse widths of said pulse signal output from said first monostable multivibrator using a reference clock pulse signal and transmitting the measured data to the control section; the second measurement section comprises a second counter with a latch for measuring the pulse widths of a horizontal drive pulse signal output from said second monostable multivibrator using a reference clock pulse signal and transmitting the measured data to said control section; the third measurement section comprises a third counter with a latch for measuring the pulse widths of said pulse signal output from said third monostable multivibrator using a reference clock pulse signal and transmitting the measured data to the control section.

9. A horizontal oscillation circuit described in claim 8, wherein the control section comprises a nonvolatile memory having first target values corresponding to various frequencies or periods; a timer for measuring the frequency or period of a horizontal synchronizing signal; and a microcomputer for taking out the first target value corresponding to a frequency or a period of an input horizontal synchronizing signal from said nonvolatile memory, for outputting a digital value corresponding to a specified fraction of the taken out value as an initial value of the first set value, for outputting a digital value corresponding to the second target value, a half value of a period of the input horizontal signal, as an initial value for the second set value, and for giving a digital value for dissolving the difference between the first target value and the output value of the first monostable multivibrator to the third D-A converter as a third set value.

10. A horizontal oscillation circuit described in claim 9, wherein the control section changes the third set value corresponding to a movement signal for a picture position adjustment given from the exterior, and sets the sum of the output value of the first measurement section and the output value of the third measurement section in the nonvolatile memory as the first target value after the completion of the adjustment.

11. A horizontal oscillation circuit described in claim 7, wherein a selector for selecting an output out of the outputs of the first pulse generator section, the output of the second pulse generator section and the output of the third pulse generator section, and a counter with a latch for measuring the pulse width of the output signal of said selector with reference clock pulses realize the first measurement section, the second measurement section and the third measurement section.

* * * * *